United States Patent
Nitta

(10) Patent No.: US 11,949,358 B2
(45) Date of Patent: Apr. 2, 2024

(54) SEMICONDUCTOR DEVICE AND MOTOR CONTROL DEVICE

(71) Applicant: RENESAS ELECTRONICS CORPORATION, Tokyo (JP)

(72) Inventor: Takeshi Nitta, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 151 days.

(21) Appl. No.: 17/578,937

(22) Filed: Jan. 19, 2022

(65) Prior Publication Data
US 2022/0271698 A1    Aug. 25, 2022

(30) Foreign Application Priority Data
Feb. 25, 2021 (JP) ................. 2021-028740

(51) Int. Cl.
*H02P 1/04*     (2006.01)
*H02M 7/5395*   (2006.01)
*H02P 27/08*    (2006.01)

(52) U.S. Cl.
CPC ........ *H02P 27/085* (2013.01); *H02M 7/5395* (2013.01)

(58) Field of Classification Search
CPC ........................... H02P 27/085; H02M 7/5395
USPC ..................................... 318/400.09
See application file for complete search history.

(56) References Cited

U.S. PATENT DOCUMENTS

| | | | | |
|---|---|---|---|---|
| 5,949,831 A | * | 9/1999 | Coker | G11B 20/10296 360/51 |
| 6,438,570 B1 | * | 8/2002 | Miller | H03H 17/04 708/625 |
| 8,166,087 B2 | | 4/2012 | Matsuyama et al. | |
| 2011/0279975 A1 | * | 11/2011 | Shimizu | H02P 6/17 377/16 |
| 2013/0170585 A1 | | 7/2013 | Rabinovitch et al. | |
| 2015/0260551 A1 | * | 9/2015 | Yamanobe | G01D 5/2454 324/207.11 |
| 2017/0075687 A1 | * | 3/2017 | Yamasaki | G06F 13/36 |
| 2020/0319814 A1 | * | 10/2020 | Kato | G06F 3/0647 |

FOREIGN PATENT DOCUMENTS

| | | |
|---|---|---|
| EP | 0 935 342 A2 | 11/1999 |
| JP | 2009-033371 A | 2/2009 |

OTHER PUBLICATIONS

Extended European Search Report issued in corresponding European Patent Application No. 22156039.4-1218, dated Jul. 20, 2022.

* cited by examiner

*Primary Examiner* — Erick D Glass
(74) *Attorney, Agent, or Firm* — Rimon, P.C.

(57) ABSTRACT

A control circuit receives a command from outside and causes an arithmetic unit to perform arithmetic operation M times (M is an integer of 2 or more) by using input data from outside and calculated data held in a memory, thereby making the arithmetic unit and the memory function as an IIR filter. The IIR filter is a filter capable of determining output data by arithmetic operation of K times out of the M times (K<M). The control circuit receives the command from outside and then causes the arithmetic unit to perform the arithmetic operation K times in advance, thereby determining the output data and outputting the output data to outside at that time.

9 Claims, 12 Drawing Sheets

| D1=Din×b0 | Dout=D1+D6' | D4=Dout×a1 | D6=D2+D4+D7' |
|---|---|---|---|
| D2=Din×b1 | | D5=Dout×a2 | D7=D3+D5 |
| D3=Din×b2 | | | |

ORDER OF PROCESSING →

| D1=Din+D7' | D2=D1×b0 | Dout=D2+D8' |
|---|---|---|
| | D3=D1×b1 | D7=D5+D6' |
| | D4=D1×b2 | D8=D3+D4' |
| | D5=D1×a1 | |
| | D6=D1×a2 | |

ORDER OF PROCESSING →

SEMICONDUCTOR DEVICE AND MOTOR CONTROL DEVICE

CROSS-REFERENCE TO RELATED APPLICATIONS

The disclosure of Japanese Patent Application No. 2021-028740 filed on Feb. 25, 2021 including the specification, drawings and abstract is incorporated herein by reference in its entirety.

BACKGROUND

The present invention relates to a semiconductor device and a motor control device, and relates to, for example, a semiconductor device including an IIR (Infinite Impulse Response) filter and a motor control device including the semiconductor device.

Patent Document 1 discloses a microprocessor capable of performing the IIR filter operation at high speed. The microprocessor includes a plurality of registers and a filter operation circuit configured to perform the IIR filter operation using data from the plurality of registers and output operated data corresponding to one sample and transfer data for the next filter operation. The plurality of registers is configured to overwrite and update the past transfer data with the new transfer data and overwrite and update the data to be operated with the operated data.

THERE ARE DISCLOSED TECHNIQUES LISTED BELOW

[Patent Document 1] Japanese Unexamined Patent Application Publication No. 2009-33371

SUMMARY

As described in Patent Document 1, the IIR filter operation is realized by, for example, causing a filter operation circuit mounted in a microprocessor to perform loop processing. On the other hand, IIR filters are generally connected in cascade in many cases. In this case, the filter operation circuit usually performs serial processing which starts from the arithmetic processing of the IIR filter at the first stage and shifts to the arithmetic processing of the IIR filter at the next stage after all the arithmetic processing is completed. Then, the filter operation circuit outputs output data of the IIR filters of the multiple stages when the arithmetic processing of the IIR filter at the final stage is completed.

However, when such serial processing is used, it takes time from when the input data is given to the IIR filters at multiple stages until the output data is obtained. For example, when the IIR filter is applied to various types of control systems, the control system usually needs to perform arithmetic processing of the IIR filters at multiple stages and further perform the processing using the output data within a control cycle. If it takes a long time to obtain the output data, there is a fear that it becomes difficult to complete the necessary processing within the control cycle.

The embodiment described below has been made in consideration of the above, and the other problems and novel features will be apparent from the description of the specification and the accompanying drawings.

A semiconductor device according to an embodiment includes: an arithmetic unit including a multiplier and an adder; a memory configured to hold calculated data; and a control circuit configured to control the arithmetic unit and the memory. The control circuit receives a command from outside and causes the arithmetic unit to perform arithmetic operation M times (M is an integer of 2 or more) by using input data from outside and the calculated data held in the memory, thereby making the arithmetic unit and the memory function as an IIR filter including a multiplication block, an addition block, and a delay block. Here, the IIR filter is a filter capable of determining output data by arithmetic operation of K times out of the M times (K<M). The control circuit receives the command from outside and then causes the arithmetic unit to perform the arithmetic operation K times in advance, thereby determining the output data and outputting the output data to the outside at the time of the determination.

According to the embodiment above, it is possible to shorten the time before the output data from the IIR filter is obtained.

BRIEF DESCRIPTION OF TRE DRAWINGS

DETAILED DESCRIPTION

Figure 1:
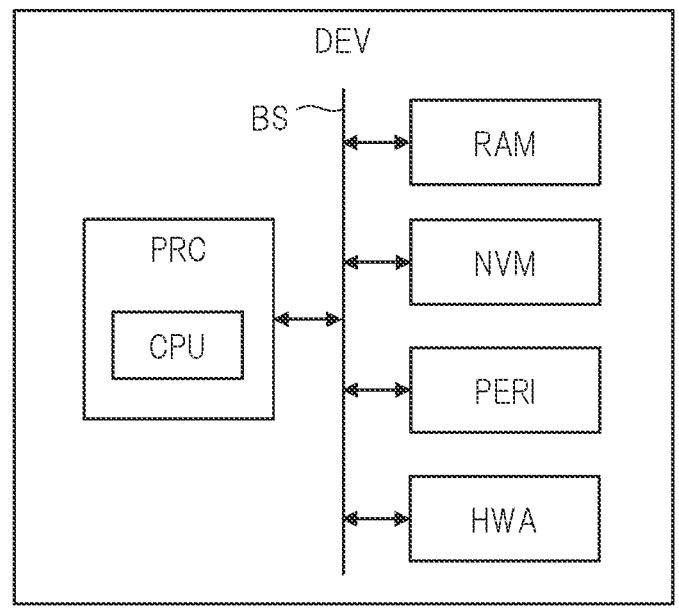
FIG. 1 is a schematic diagram showing a configuration example of a semiconductor device according to the first embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification, details, or a supplementary explanation thereof. Also, in the embodiments described below, when mentioning the number of elements (including number of pieces, values, amount, range, and the like), the number of the elements is not limited to a specific number unless otherwise stated or except the case where the number is apparently limited to a specific number in principle, and the number larger or smaller than the specific number is also applicable.

Furthermore, in the embodiments described below, it goes without saying that each component (including an element step) is not indispensable unless otherwise clearly specified or unless it is obvious that the component is indispensable in principle. Likewise, in the embodiments described below, when mentioning a shape, a positional relation, or the like of a component, a substantially approximate shape, a similar shape, or the like is included unless otherwise clearly specified or unless it is obvious from the context that the shape, the positional relation, or the like of the component differs in principle. The same applies to the above-described numerical value and range.

Also, circuit elements constituting each functional block in the embodiment are not particularly limited, and are formed on a semiconductor substrate made of single crystal silicon or the like by the well-known integrated circuit technology such as CMOS (Complementary MOS transistor).

Hereinafter, embodiments of the present invention will be described in detail with reference to the drawings. Note that the same members are denoted by the same reference characters in principle throughout the drawings for describing the embodiments and the repetitive description thereof will be omitted.

First Embodiment (Outline of Semiconductor Device)

FIG. 1 is a schematic diagram showing a configuration example of a semiconductor device according to the first embodiment of the present invention. A semiconductor device DEV shown in FIG. 1 is typically a microcontroller, an SoC (System on a Chip), or the like. The semiconductor device DEV includes a processor PRC, memories such as a RAM (Random Access Memory) and a non-volatile memory NVM, various peripheral circuits PERI, and a hardware accelerator HWA. Each of these parts is connected to each other by a bus BS.

The processor PRC includes a CPU (Central Processing Unit). The CPU realizes a predetermined function by executing a program stored in the memory. The hardware accelerator HWA is a circuit that supports the processing of the CPU. The hardware accelerator HWA receives a command from the CPU via the bus BS, and performs, for example, an IIR filter operation or the like in response to the command from the CPU.

The various peripheral circuits PERI include various circuits typified by an analog-to-digital converter, a digital-to-analog converter, a PWM (Pulse Width Modulation) unit, an external communication interface, and the like. The semiconductor device according to the first embodiment may be, for example, an FPGA (Field Programmable Gate Array), an ASIC (Application Specific Integrated Circuit), or the like other than the microcontroller and the like.

Figure 2:
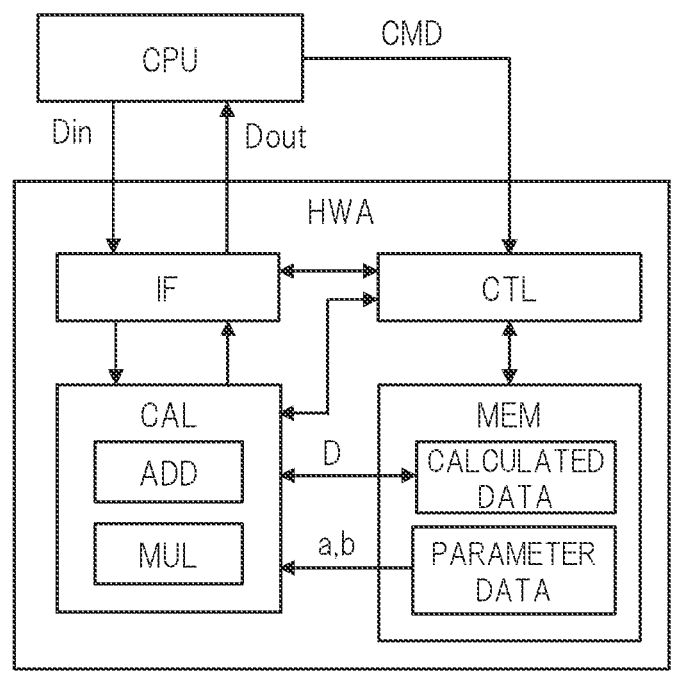
FIG. 2 is a schematic diagram showing a configuration example of a hardware accelerator in FIG. 1.

FIG. 2 is a schematic diagram showing a configuration example of the hardware accelerator in FIG. 1. The hardware accelerator HWA shown in FIG. 2 includes an interface IF, an arithmetic unit CAL, a memory MEM, and a control circuit CTL. The interface IF outputs the input data Din from the CPU to the arithmetic unit CAL, and outputs the output data Dout from the arithmetic unit CAL to the CPU.

The memory MEM includes, for example, a plurality of registers and the like. The memory MEM uses the plurality of registers and the like to hold parameter data a and b used in the IIR filter and calculated data D obtained during the IIR filter operation. Along with this, the memory MEM also has a function of a delay block (DB) included in the IIR filter.

The arithmetic unit CAL includes a multiplier MUL and an adder ADD. The multiplier MUL functions as a multiplication block (MB) included in the IIR filter, and multiplies the predetermined data by the parameter data a and b from the memory MEM. The adder ADD functions as an addition block (AB) included in the IIR filter, and adds a plurality of predetermined data.

The control circuit CTL receives a command CMD from outside, that is, a CPU, and controls the interface IF, the arithmetic unit CAL, and the memory MEM. In general, the control circuit CTL receives the command CMD from the CPU, and causes the arithmetic unit CAL to perform the arithmetic operation M times (M is an integer of 2 or more) by using the input data Din from the CPU and the calculated data D and the parameter data a and b held in the memory MEM. Consequently, the control circuit CTL makes the arithmetic unit CAL and the memory MEM function as an IIR filter including a multiplication block, an addition block, and a delay block. Further, the control circuit CTL causes the arithmetic unit CAL to output the output data Dout of the IIR filter to the CPU via the interface IF.

(Method of Realizing IIR Filter by Hardware Accelerator)

Figures 3A, 3B:
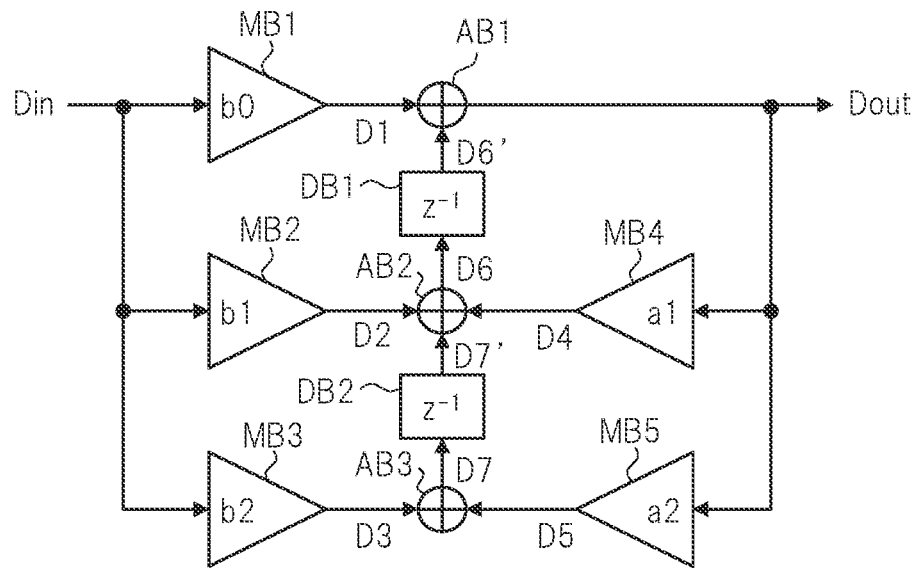
FIG. 3A is a block diagram showing a configuration example of an IIR filter realized by the hardware accelerator in FIG. 2.
FIG. 3B is a diagram for describing an operation example of the IIR filter in FIG. 3A.

FIG. 3A is a block diagram showing a configuration example of an IIR filter realized by the hardware accelerator in FIG. 2, and FIG. 3B is a diagram for describing an operation example of the IIR filter in FIG. 3A. The IIR filter shown in FIG. 3A is a second-order biquad IIR filter, and has a flipped configuration of the direct form II. The IIR filter includes two delay blocks DB1 and DB2, five multiplication blocks MB1 to MB5, and three addition blocks AB1 to AB3. In FIG. 3A, the left half serves as a feed-forward section and the right half serves as a feedback section.

The multiplication blocks MB1, MB2, and MB3 generate calculated data D1, D2, and D3 by multiplying the input data Din by the parameter data b0, b1, and b2, respectively. The multiplication blocks MB4 and MB5 generate calculated data D4 and D5 by multiplying the output data Dout by the parameter data a1 and a2, respectively. The addition block AB3 generates calculated data D7 by adding the calculated data D3 and the calculated data D5. The delay block DB2 generates calculated data (in other words, delay data) D7' by delaying the calculated data D7 by one sampling cycle.

The addition block AB2 generates calculated data D6 by adding the calculated data D2, the calculated data D4, and the calculated data (delay data) D7'. The delay block DB1 generates calculated data (delay data) D6' by delaying the calculated data D6 by one sampling cycle. The addition block AB1 generates the output data Dout by adding the calculated data D1 and the calculated data (delay data) D6'.

The multiplication blocks MB1 to MB5 are realized by the multiplier MUL in the arithmetic unit CAL in FIG. 2. The parameter data b0, b1, b2, a1, and a2 at this time are held in the memory MEM in advance. The addition blocks AB1 to AB3 are realized by the adder ADD in the arithmetic unit CAL. The delay blocks DB1 and DB2 are realized by the memory MEM. Namely, the memory MEM holds the calculated data D6 and D7 as the delay data D6' and D7' for one sampling cycle.

In the IIR filter in FIG. 3A, for example, in order to obtain the calculated data D4, the output data Dout is necessary as a premise, and in order to obtain the output data Dout, the calculated data D1 is necessary as a premise. In this way, each data has a dependence relationship. FIG. 3B shows the order of processing based on such data dependence relationship. The control circuit CTL in FIG. 2 causes the arithmetic unit CAL to perform arithmetic operation M times (M=8 in this example) based on such data dependence relationship, thereby making the arithmetic unit CAL, the memory MEM, and the like function as the IIR filter in FIG. 3A.

Here, as can be seen from FIG. 3B, the IIR filter of FIG. 3A has the configuration in which the output data Dout can be determined by performing arithmetic operation K times (K=2 in this example) out of M times (M=8) with K<M. Namely, the control circuit CTL just causes the arithmetic unit CAL to perform the arithmetic operation of the multiplication block MB1 and then perform the arithmetic operation of the addition block AB1. At the time of the arithmetic operation of the addition block AB1, the arithmetic unit CAL just adds the calculated data D1 associated with the multiplication block MB1 and the calculated data (delay data) D6' held by the memory MEM.

In the hardware accelerator HWA in the first embodiment, after receiving the command CMD from the CPU, the control circuit CTL causes the arithmetic unit CAL to perform the arithmetic operation K times (K=2) in advance, thereby determining the output data Dout. Then, at the time of the determination, the control circuit CTL causes the arithmetic unit CAL to output the output data Dout to the CPU.

For example, a hardware accelerator as a comparative example outputs the output data Dout to the CPU when all the arithmetic operations of M times (M=8) shown in FIG. 3B are completed. On the other hand, the hardware accelerator HWA of the first embodiment can output the output data Dout to the CPU at the time when the arithmetic operations of K times (K=2) out of M times are completed. As a result, it is possible to shorten the time before the output data Dout is obtained.

Note that the arithmetic operations of M times (M=8) shown in FIG. 3B are divided into output data operation and delay data operation. The output data operation is an arithmetic operation necessary for determining the output data Dout, and corresponds to the arithmetic operation of the calculated data D1 and the arithmetic operation of the output data Dout in the example of FIG. 3B. On the other hand, the delay data operation is an arithmetic operation necessary for determining the data to be held in the memory MEM functioning as the delay blocks DB1 and DB2, that is, the calculated data D6 and D7 corresponding to the delay data D6' and D7'.

The delay data operation corresponds to at least the arithmetic operation of 6 times except for the output data operation in the example of FIG. 3B. However, in order to determine the calculated data D6 and D7 corresponding to the delay data, the output data Dout is also necessary. Therefore, on the premise that the output data Dout is unknown, the delay data operation corresponds to the arithmetic operation of 8 times in total. In the hardware accelerator HWA of the first embodiment, the control circuit CTL causes the arithmetic unit CAL to perform the output data operation in advance and then perform the delay data operation.

Figures 4A, 4B:
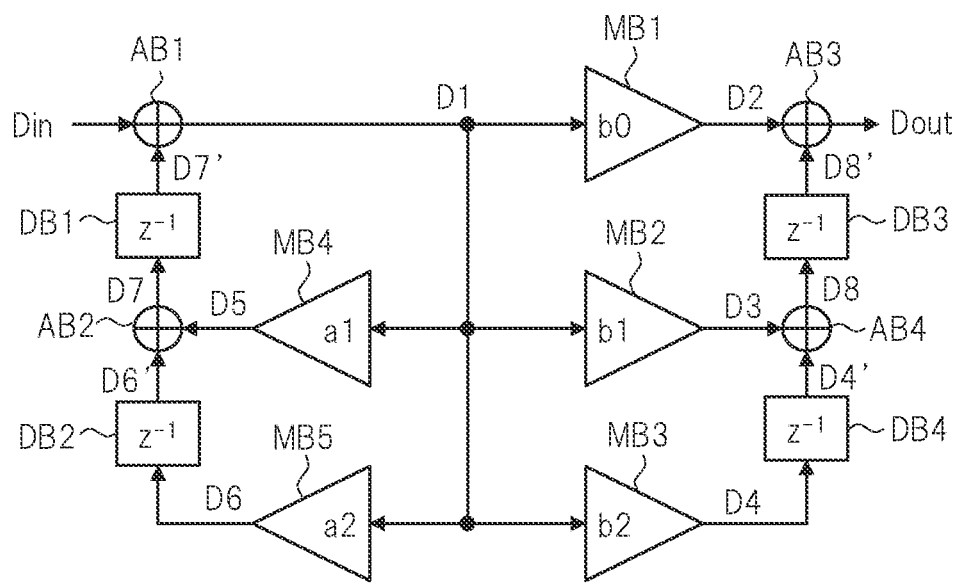
FIG. 4A is a block diagram showing a configuration example of another IIR filter realized by the hardware accelerator in FIG. 2.
FIG. 4B is a diagram for describing an operation example of the IIR filter in FIG. 4A.

FIG. 4A is a block diagram showing a configuration example of another IIR filter realized by the hardware accelerator in FIG. 2, and FIG. 4B is a diagram for describing an operation example of the IIR filter in FIG. 4A. The IIR filter shown in FIG. 4A is also a second-order biquad IIR filter, but has a flipped configuration of the direct form I different from that in FIG. 3A. The IIR filter includes four delay blocks DB1 to DB4, five multiplication blocks MB1 to MB5, and four addition blocks AB1 to AB4. In FIG. 4A, the left half serves as a feedback section and the right half serves as a feed-forward section.

The addition block AB1 generates the calculated data D1 by adding the input data Din and the calculated data (delay data) D7'. The multiplication blocks MB1, MB2, and MB3 generate calculated data D2, D3, and D4 by multiplying the calculated data D1 by the parameter data b0, b1, and b2, respectively. The multiplication blocks MB4 and MB5 generate calculated data D5 and D6 by multiplying the calculated data D1 by the parameter data a1 and a2, respectively.

The delay block DB2 generates the calculated data (delay data) D6' by delaying the calculated data D6 by one sampling cycle. The delay block DB4 generates calculated data (delay data) D4' by delaying the calculated data D4 by one sampling cycle. The addition block AB2 generates the calculated data D7 by adding the calculated data D5 and the calculated data (delay data) D6'. The addition block AB4 generates calculated data D8 by adding the calculated data D3 and the calculated data (delay data) D4'.

The delay block DB1 generates the calculated data (delay data) D7' by delaying the calculated data D7 by one sampling cycle. The delay block DB3 generates calculated data (delay data) D8' by delaying the calculated data D8 by one sampling cycle. The addition block AB3 generates the output data Dout by adding the calculated data D2 and the calculated data (delay data) D8'.

Similarly to the case of FIG. 3A, the multiplication blocks MB1 to MB5 in FIG. 4A are realized by the multiplier MUL, the addition blocks AB1 to AB4 are realized by the adder ADD, and the delay blocks DB1 to DB4 are realized by the memory MEM. Further, FIG. 4B shows the order of processing for the IIR filter of FIG. 4A based on the data dependence relationship similar to the case of FIG. 3B. The control circuit CTL in FIG. 2 causes the arithmetic unit CAL to perform arithmetic operation M times (M=9 in this example) based on such data dependence relationship, thereby making the arithmetic unit CAL, the memory MEM, and the like function as the IIR filter in FIG. 4A.

Here, as can be seen from FIG. 4B, similarly to the case of FIG. 3A, the IIR filter in FIG. 4A also has the configuration in which the output data Dout can be determined by performing arithmetic operation K times (K=3 in this example) out of M times (M=9). Namely, the control circuit CTL just causes the arithmetic unit CAL to perform the processing of the addition block AB1, subsequently perform the processing of the multiplication block MB1, and then perform the processing of the addition block AB3.

Similarly to the case of FIG. 3A and FIG. 3B, after receiving the command CMD from the CPU, the control circuit CTL in FIG. 2 causes the arithmetic unit CAL to perform the arithmetic operation K times (K=3) in advance, thereby determining the output data Dout. Then, at the time of the determination, the control circuit CTL causes the arithmetic unit CAL to output the output data Dout to the CPU.

Consequently, the hardware accelerator HWA of the first embodiment can output the output data Dout to the CPU at the time when the arithmetic operations of K times (K=3) out of M times (M=9) are completed. As a result, it is possible to shorten the time before the output data Dout is obtained. At this time, in the configuration example shown in FIG. 3A, the time can be shortened by the amount equivalent to one arithmetic operation as compared with the configuration example shown in FIG. 4A. Note that the control circuit CTL causes the arithmetic unit CAL to perform the delay data operation after causing it to perform the output data operation in advance similarly to the case of FIG. 3A and FIG. 3B.

Figure 5:
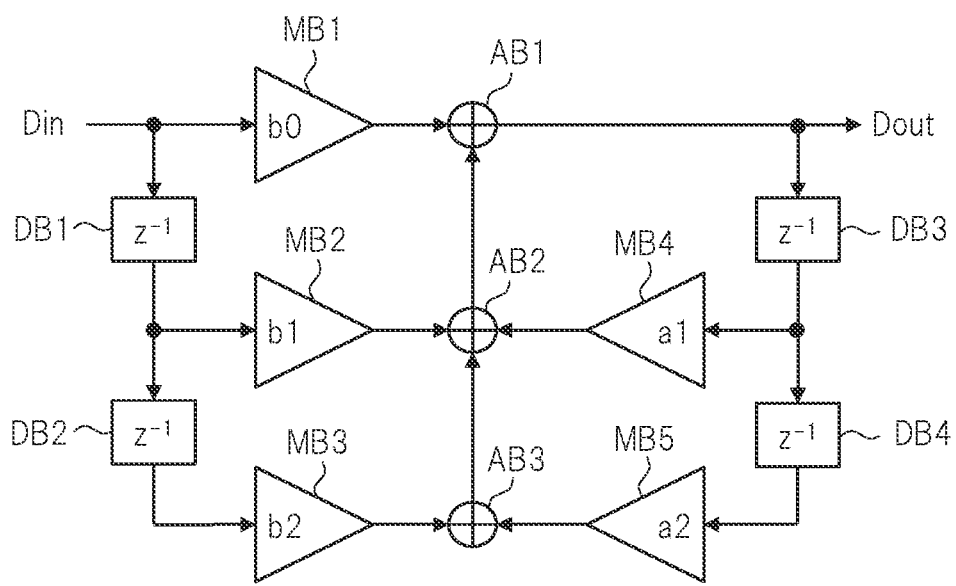
FIG. 5 is a block diagram showing a configuration example of an IIR filter different from that of FIG. 3A.
Figure 6:
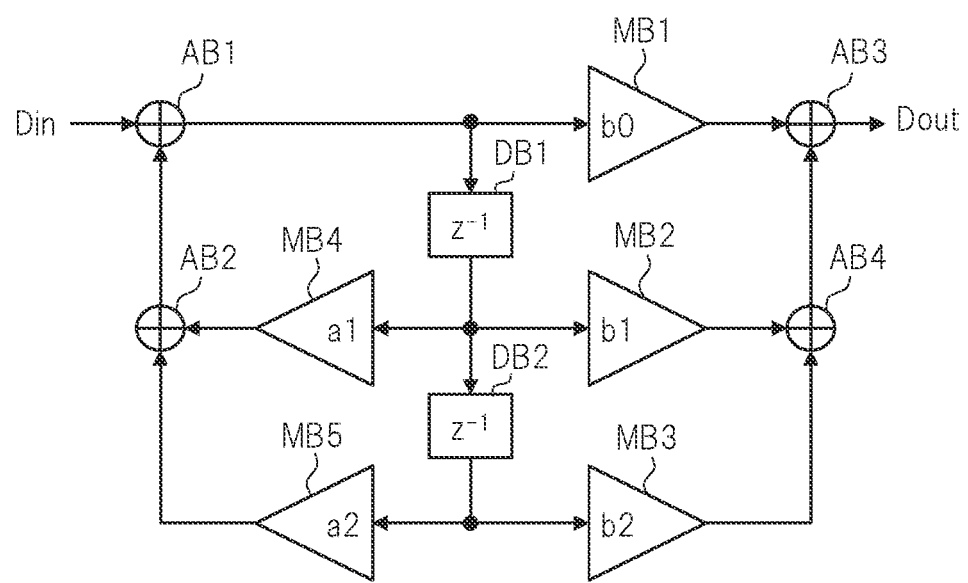
FIG. 6 is a block diagram showing a configuration example of an IIR filter different from that of FIG. 4A.

FIG. 5 is a block diagram showing a configuration example of an IIR filter different from that of FIG. 3A, and FIG. 6 is a block diagram showing a configuration example of an IIR filter different from that of FIG. 4A. The IIR filter shown in FIG. 5 has a configuration of the direct form I different from the flipped configuration of the direct form II shown in FIG. 3A. The IIR filter shown in FIG. 6 has a configuration of the direct form II different from the flipped configuration of the direct form I shown in FIG. 4A.

The flipped configuration of the direct form II in FIG. 3A and the configuration of the direct form I in FIG. 5 are different in the position of the delay block. Similarly, the flipped configuration of the direct form I in FIG. 4A and the configuration of the direct form II in FIG. 6 are also different in the position of the delay block. Namely, the delay is performed after the multiplication and addition are performed in the cases of FIG. 3A and FIG. 4A, while the multiplication and addition are performed after the delay is performed in the cases of FIG. 5 and FIG. 6.

When the configuration is not the flipped configuration as shown in FIG. 5 and FIG. 6, unlike the case of the flipped configuration shown in FIG. 3A and FIG. 4A, the arithmetic operations of M times using all the multiplication blocks and addition blocks are necessary in order to determine the output data Dout. Namely, the number of times K of the output data operation is equal to the total number of times M of the operation, resulting in K=M=8 in FIG. 5 and K=M=9 in FIG. 6. Therefore, when the configuration is not the flipped configuration, it may be difficult to shorten the time before the output data Dout is obtained even if the output data operation is preceded.

(Details of Hardware Accelerator)

Figure 7:
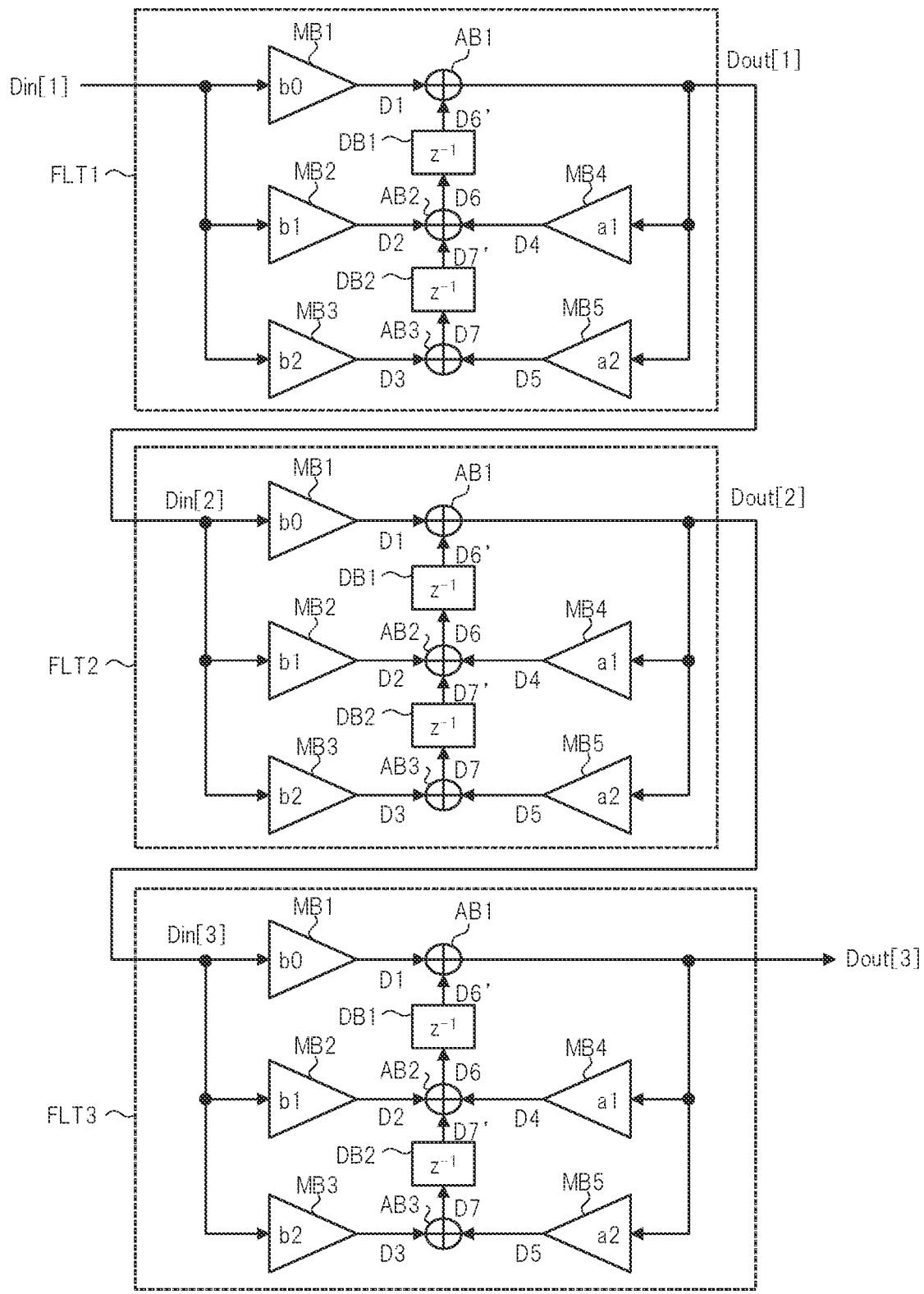
FIG. 7 is a block diagram showing a configuration example in practical use of the IIR filter realized by the hardware accelerator in FIG. 2.

FIG. 7 is a block diagram showing a configuration example in practical use of the IIR filter realized by the hardware accelerator in FIG. 2. As shown in FIG. 7, in practical use, the IIR filter is used as IIR filters connected in cascade at multiple stages (three stages here) in many cases. Each of the IIR filter FLT1 at the first stage, the IIR filter FLT2 at the second stage, and the IIR filter FLT3 at the final stage has the flipped configuration of the direct form II shown in FIG. 3A.

The IIR filter FLT1 at the first stage receives input data Din[1] and outputs output data Dout[1]. The IIR filter FLT2 at the second stage receives the output data Dout[1] of the first stage as input data Din[2] and outputs output data Dout[2]. The IIR filter FLT3 at the final stage receives the output data Dout[2] of the second stage as input data Din[3] and outputs output data Dout[3]. In this way, the three-stage IIR filters receive the input data Din[1] and output the output data Dout[3] as a whole.

Figure 8:
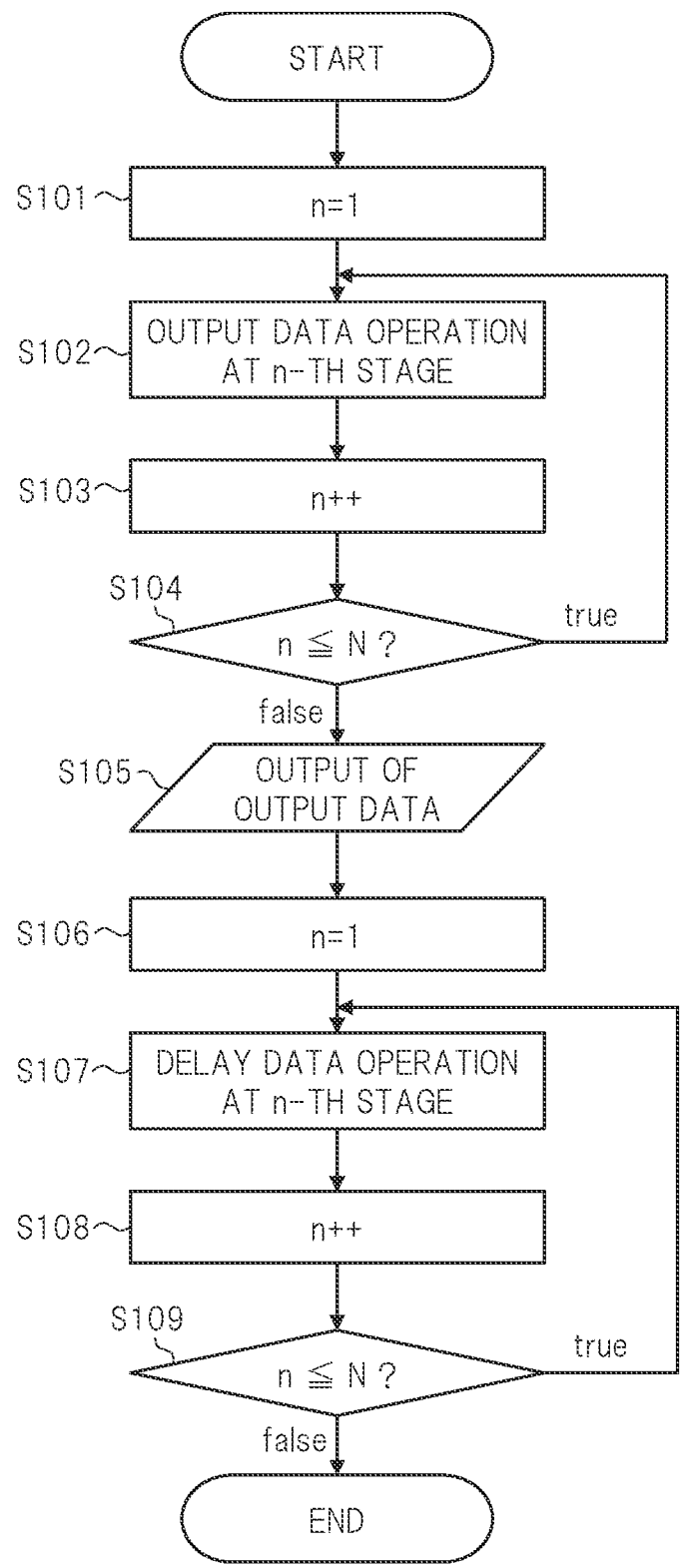
FIG. 8 is a flowchart showing an example of processing contents of a control circuit in the hardware accelerator in FIG. 2.

FIG. 8 is a flowchart showing an example of processing contents of a control circuit in the hardware accelerator in FIG. 2. Here, the case in which the control circuit CTL causes the arithmetic unit CAL and the memory MEM to function as the three-stage IIR filters shown in FIG. 7 is assumed. In FIG. 8, the control circuit CTL receives the command CMD from the CPU and first sets n=1 (step S101).

Subsequently, the control circuit CTL causes the arithmetic unit CAL to perform the output data operation at the n-th stage by using the input data from the CPU, that is, the input data Din[1] at the first stage in FIG. 7 (step S102). Next, the control circuit CTL repeatedly performs the processes of steps S102 and S103 until n becomes larger than the maximum number of stages N (here, N=3) while incrementing n (step S103) (step S104).

As a result, the output data of the IIR filter at the final stage, that is, the output data Dout[3] of FIG. 7 is obtained by the arithmetic unit CAL. When n becomes larger than N in step S104, the control circuit CTL causes the arithmetic unit CAL to output the output data of the IIR filter at the final stage to the CPU via the interface IF (step S105).

Thereafter, the control circuit CTL sets n=1 again (step S106). Subsequently, the control circuit CTL causes the arithmetic unit CAL to perform the delay data operation at the n-th stage (step S107). Next, the control circuit CTL repeatedly performs the processes of steps S107 and S108 until n becomes larger than the maximum number of stages N (N=3) while incrementing n (step S108) (step S109). As a result, the calculated data (delay data) D6' and D7' to be held in the delay blocks DB1 and DB2 in each of the IIR filters FLT1 to FLT3 in FIG. 7 and the memory MEM in FIG. 2 are determined, and a series of processing as the three-stage IIR filter is completed.

Figure 9:
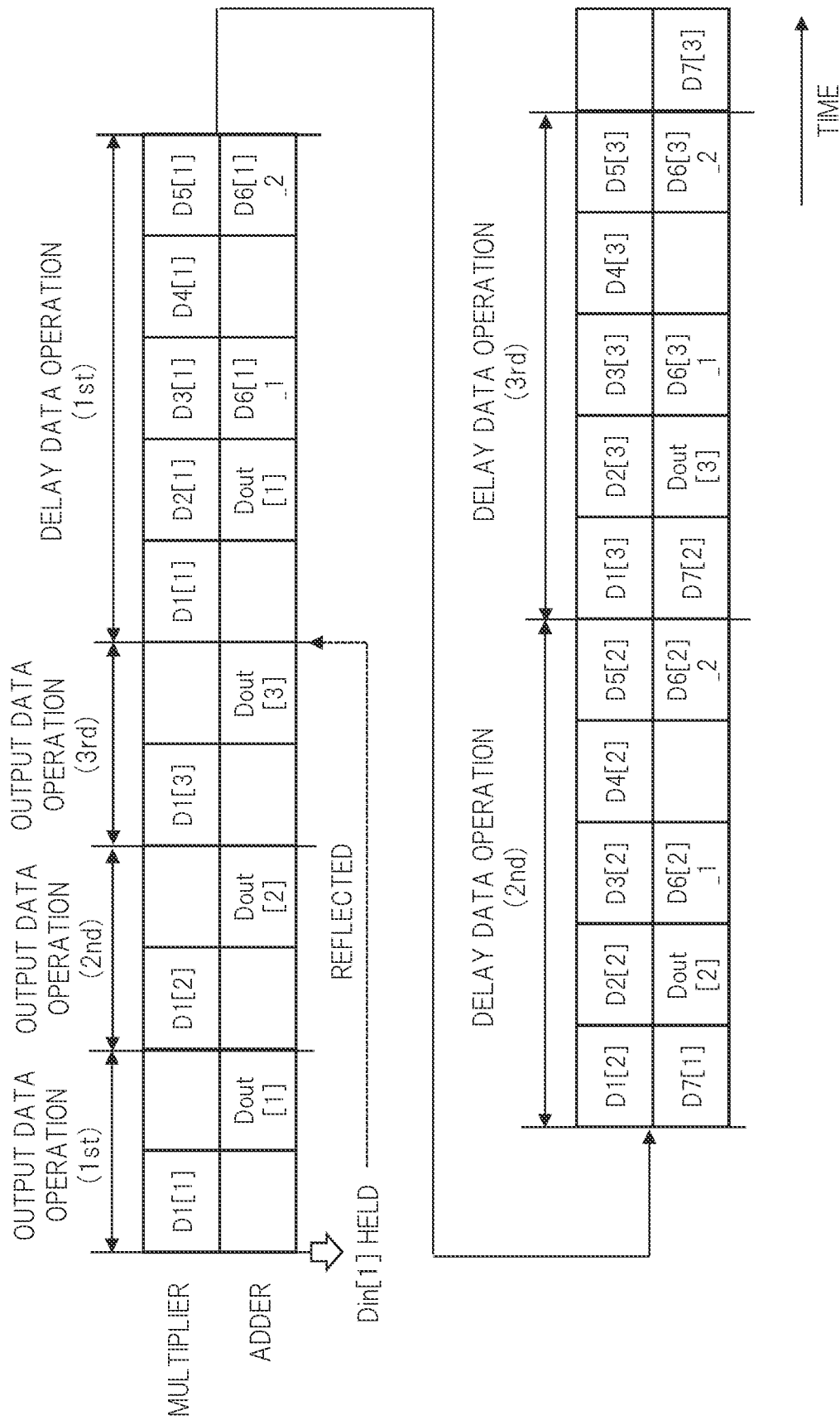
FIG. 9 is a diagram showing an example of a detailed arithmetic operation procedure by an arithmetic unit in the flow in FIG. 8.

FIG. 9 is a diagram showing an example of a detailed arithmetic operation procedure by the arithmetic unit in the flow in FIG. 8. Here, the case in which the arithmetic unit CAL in FIG. 2 includes one adder ADD configured to add two data and one multiplier MUL configured to multiply two data and the adder ADD and the multiplier MUL can perform one arithmetic operation within one clock cycle of the processor PRC and perform the arithmetic operations in parallel is assumed. In this case, for example, the addition of three data (X=A+B+C) is realized by the addition in two clock cycles (tmp=A+B, X=tmp+C).

As a schematic operation of FIG. 9, after receiving the command CMD from the CPU, the control circuit CTL first causes the arithmetic unit CAL to perform the output data operation in the multi-stage (here, three-stage) IIR filters sequentially from the first stage to the final stage. Thereafter, the control circuit CTL causes the arithmetic unit CAL to perform the delay data operation in the multi-stage IIR filters sequentially from the first stage to the final stage. Then, at the time when the output data operation in the IIR filter at the final stage is completed, the control circuit CTL causes the arithmetic unit CAL to output the output data Dout[3] of the IIR filter at the final stage to the CPU.

As a detailed operation of FIG. 9, the arithmetic unit CAL first performs the output data operation at the first stage in two clock cycles, and then performs the output data operations at the second and third stages in two clock cycles, respectively. In the output data operation at the first stage, the arithmetic unit CAL receives the input data Din[1] from the CPU, generates calculated data D1[1] in the first clock cycle, and generates the output data Dout[1] in the second clock cycle. Here, "x" in [x] represents the number of stages.

In the output data operation at the second stage, the arithmetic unit CAL receives the output data Dout[1] of the first stage as the input data Din[2], and similarly generates calculated data D1[2] and the output data Dout[2]. The same applies to the output data operation at the third stage.

Thereafter, the arithmetic unit CAL performs the delay data operation at the first stage in five clock cycles, and subsequently performs the delay data operations at the second stage and the third stage in five clock cycles, respectively. Here, the control circuit CTL causes the memory MEM to hold the input data Din[1] from the CPU prior to the output data operation at the first stage described above. Then, the control circuit CTL causes the arithmetic unit CAL to sequentially perform the delay data operations from the first stage to the third stage by using the held input data Din[1]. In other words, the arithmetic unit CAL performs the operations of the IIR filters at the multiple stages again from the beginning.

In the delay data operation at the first stage, the arithmetic unit CAL sequentially generates the calculated data D1[1] and D2[1] in the first clock cycle and the second clock cycle in the five clock cycles, and generates also the output data Dout[1] in parallel in the second clock cycle. Then, the arithmetic unit CAL sequentially generates calculated data D3[1], D4[1], and D5[1] in the third, fourth, and fifth clock cycles, and generates calculated data D6[1] separately in the third clock cycle and the fifth clock cycle in parallel with this. Regarding the calculated data D6[1], specifically, the arithmetic unit CAL adds the calculated data D2 [1] and delay data D7' [1] in the third clock cycle, and adds this addition result and the calculated data D4[1] in the fifth clock cycle.

The delay data calculation at the second stage is the same as that at the first stage except for the following two differences. The first difference is that the arithmetic unit CAL performs arithmetic processing by using the output data Dout[1] of the first stage as the input data Din[2] of the second stage. The second difference is that the arithmetic unit CAL generates the calculated data D7[1] at the first stage in the first clock cycle in the five clock cycles in parallel with the generation of the calculated data D1[2] at the second stage. The delay data operation at the third stage is the same as that at the second stage.

Figure 10:
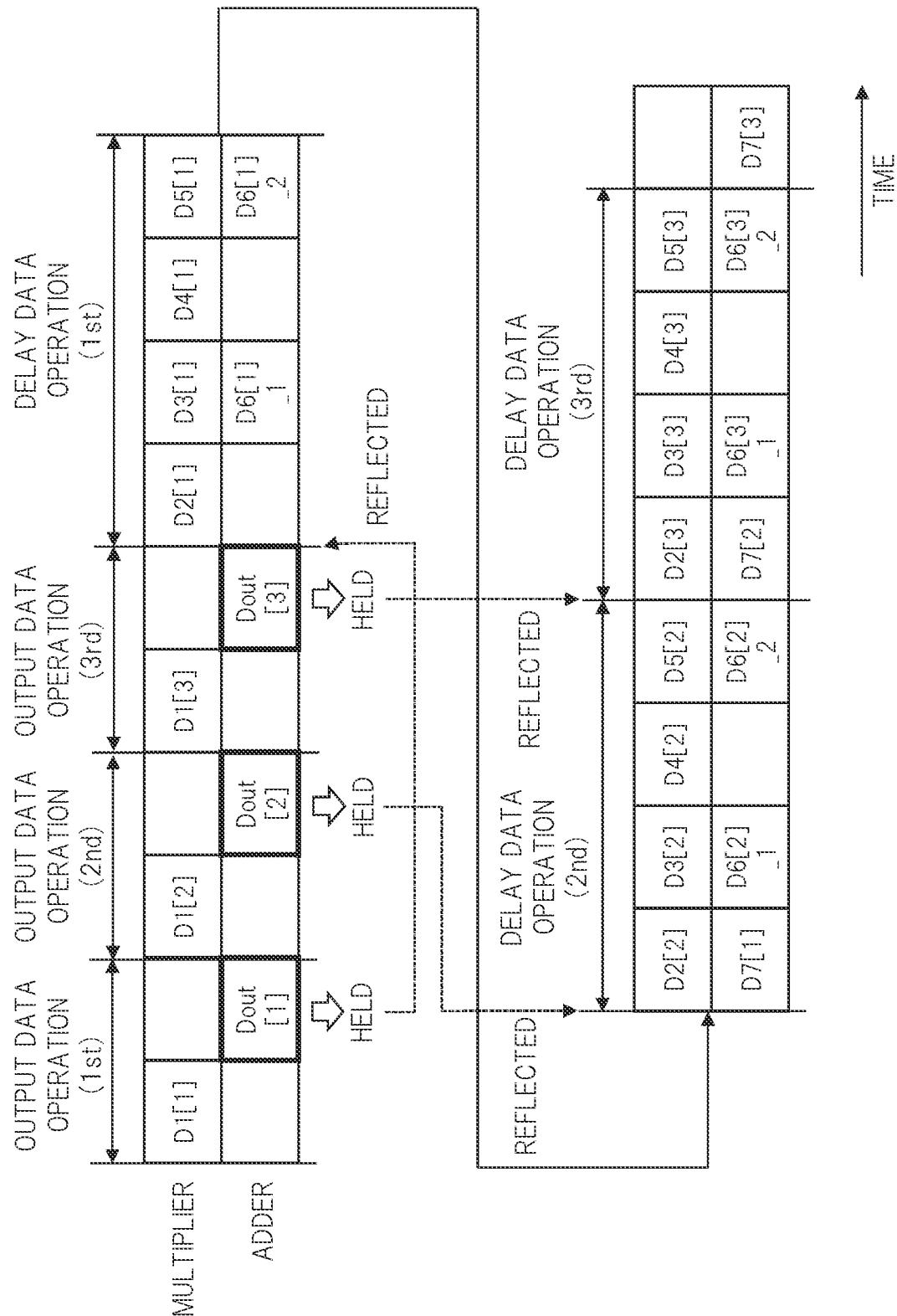
FIG. 10 is a diagram showing an example of an arithmetic operation procedure different from that in FIG. 9.

FIG. 10 is a diagram showing an example of an arithmetic operation procedure different from that in FIG. 9. In FIG. 10, the output data operations at the first state, the second stage, and the third stage are the same as those of FIG. 9. However, in FIG. 10, unlike the case of FIG. 9, the control circuit CTL causes the memory MEM to hold the calculated data obtained by the output data operations at the first to third stages, in this example, the output data Dout[1], Dout[2], and Dout[3]. Then, the control circuit CTL causes the arithmetic unit CAL to perform the delay data operations at the first to third stages by using the held calculated data.

Here, at the time of the delay data operation of the IIR filter FLT1 at the first stage, when the output data Dout[1] is held, the arithmetic unit CAL can generate the calculated data D4[1], D5[1], and the like without generating the calculated data D1[1]. The same applies to the second stage and the third stage. Therefore, in the delay data operations at the first stage, the second stage, and the third stage in FIG. 10, the clock cycles for generating the calculated data D1[1], D1 [2], and D1[3] are deleted as compared with the case of FIG. 9.

As a result, the arithmetic unit CAL can perform the delay data operation at the first stage in four clock cycles, and subsequently perform the delay data operations at the second stage and the third stage in four clock cycles, respectively. Further, the arithmetic unit CAL generates the calculated data D7[1] and D7[2] at the previous stage, which are generated in parallel with the calculated data D1[2] and D1[3] in FIG. 9, in the first clock cycle in the four clock cycles. Namely, the arithmetic unit CAL generates the calculated data D7[1] of the first stage in parallel with the calculated data D2[2] in the first clock cycle in the delay data operation at the second stage, and generates the calculated data D7[2] of the second stage in parallel with the calculated data D2[3] in the first clock cycle in the delay data operation at the third stage.

When the method of FIG. 9 and the method of FIG. 10 are compared, the method of FIG. 10 is beneficial from the viewpoint of the number of clock cycles required for the delay data operation. However, in the method of FIG. 10, since it is necessary to cause the memory MEM to hold the output data Dout[1], Dout[2], and Dout[3] corresponding to the number of stages of the IIR filter, the method of FIG. 9 is beneficial from the viewpoint of the circuit scale (for example, the number of registers, etc.). Although the configuration example of FIG. 3A is used for the IIR filter at each stage here, when the method of FIG. 10 is used by using the configuration example of FIG. 4A, the control circuit CTL just causes the memory MEM to hold the calculated data D1 of each stage obtained in the output data operation.

Main Effect of First Embodiment

As described above, by using the method of the first embodiment, it is possible to shorten the time before the output data from the IIR filter is obtained. As a result, in various control systems, necessary processing can be completed within the control cycle without, for example, increasing the speed of the clock frequency of the processor. From another point of view, the control cycle can be shortened, and a highly accurate control system can be constructed. The details thereof will be described below.

Figure 14:
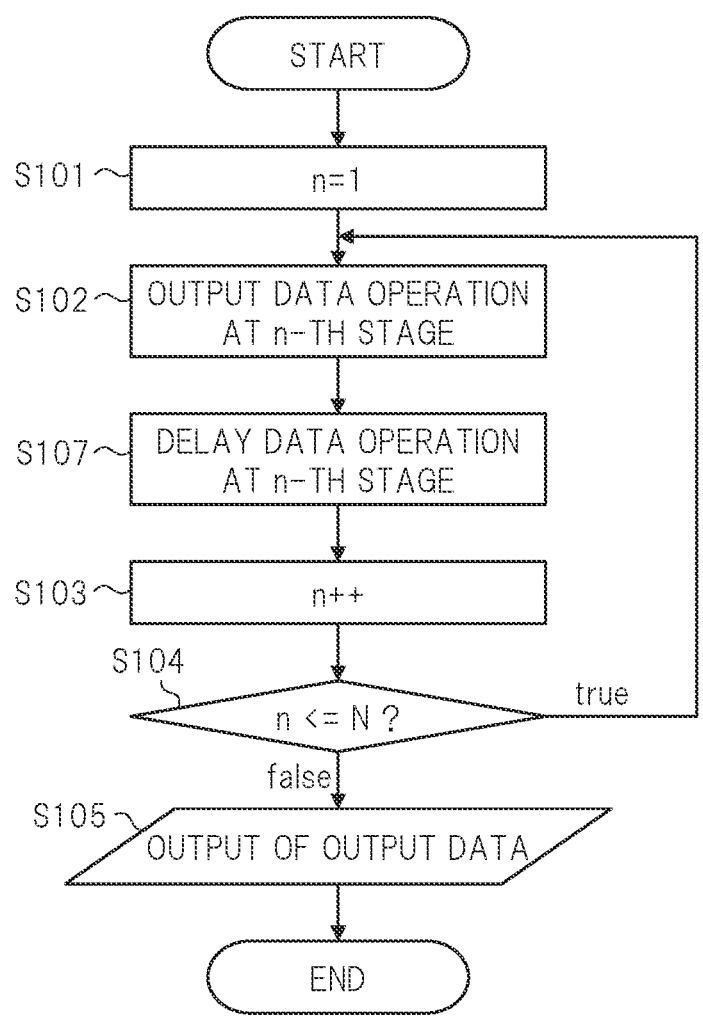
FIG. 14 is a flowchart showing an example of processing contents of a control circuit in a hardware accelerator in a semiconductor device according to a comparative example of the present invention.

FIG. 14 is a flow diagram showing an example of processing contents of a control circuit in a hardware accelerator in a semiconductor device according to a comparative example of the present invention. In the flow shown in FIG. 14, unlike the flow shown in FIG. 8, the delay data operation (step S107) at the n-th stage is performed following the output data operation (step S102) at the n-th stage in the processing at each stage. Then, at the time when the output data operation and the delay data operation at the final stage are finished (step S104), the output data is output to the CPU (step S105).

Figure 11:
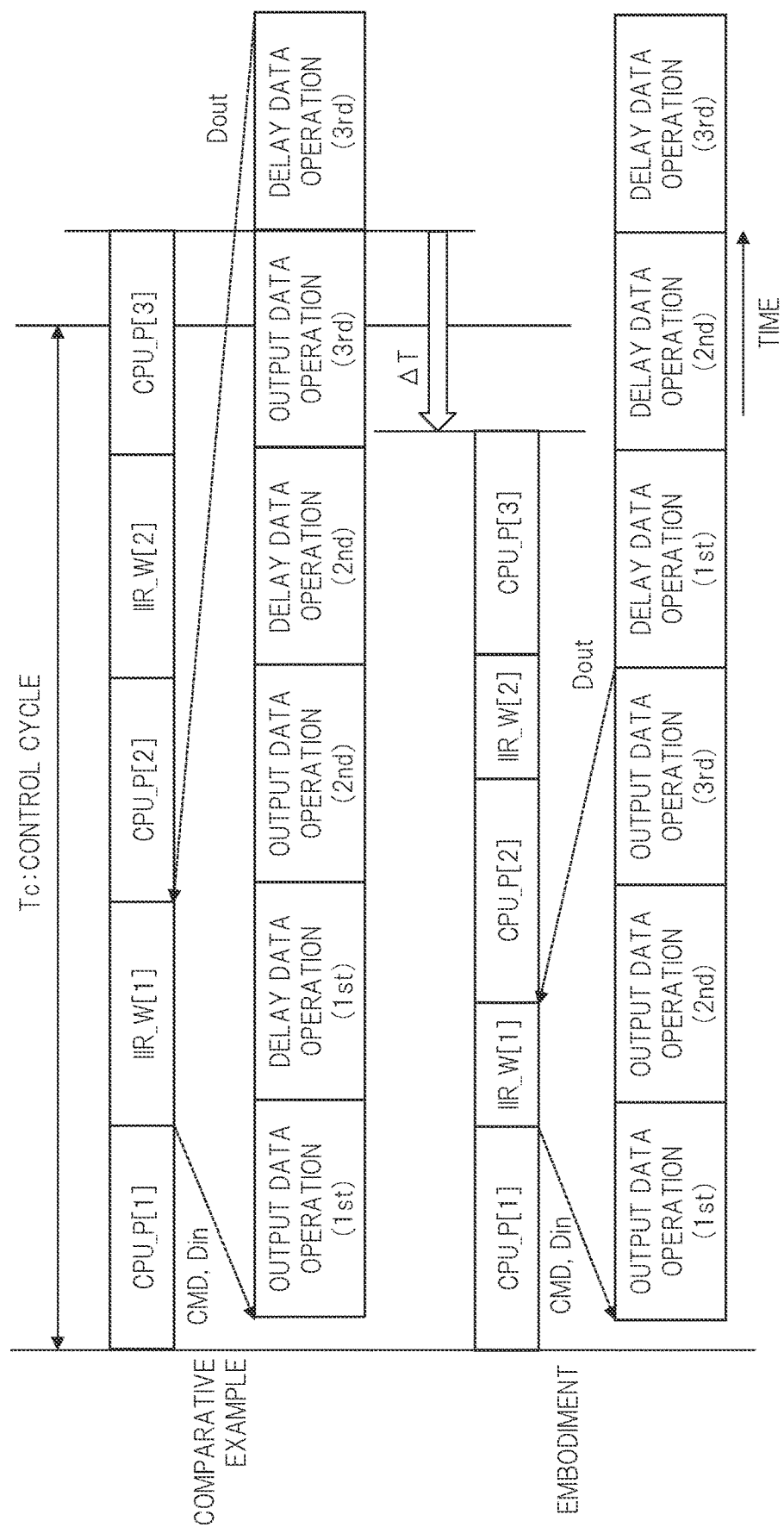
FIG. 11 is a conceptual diagram showing the comparison of the process flow of the control system between the case of using the flow of the embodiment in FIG. 8 and the case of using the flow of a comparative example in FIG. 14.

FIG. 11 is a conceptual diagram showing the comparison of the process flow of the control system between the case of using the flow of the embodiment in FIG. 8 and the case of using the flow of the comparative example in FIG. 14. As shown in FIG. 11, in a general control system including an IIR filter, CPU processing periods CPU_P[1], CPU_P[2], and CPU_P[3] and IIR filter operation waiting periods IIR_W[1] and IIR_W[2] are provided in a control cycle Tc.

For example, the CPU performs a predetermined process within the CPU processing period CPU_P[1] and then causes the hardware accelerator HWA to perform the operation of the IIR filter by outputting the command CMD and the input data Din. Subsequently, the CPU waits until the output data Dout from the hardware accelerator HWA is obtained in the waiting period IIR_W[1]. Thereafter, when the output data Dout is obtained, the CPU performs the next process by using the output data Dout in the CPU processing period CPU_P[2].

In the processing of the control system described above, in order to obtain the output data Dout, the CPU in the method of the comparative example needs to wait until the delay data operation at the final stage (here, the third stage) is completed, that is, all output data operations and delay data operations in the IIR filters at the multiple stages are completed. Therefore, there is a fear that the waiting periods IIR_W[1] and IIR_W[2] increase and the necessary processing time exceeds the control cycle Tc. Further, in order to shorten the necessary processing time, the speed of the clock frequency of the processor needs to be increased, which may lead to an increase in cost and an increase in power consumption.

On the other hand, in order to obtain the output data Dout, the CPU in the method of the present embodiment only waits until the output data operations in the IIR filters at multiple stages are completed. The CPU can perform the next processing by using the output data Dout obtained by this output data operation. Further, the CPU can cause the hardware accelerator HWA to perform the delay data operations in the IIR filters at the multiple stages in parallel with the next processing.

As a result, by using the method of the present embodiment, the waiting periods IIR_W[1] and IIR_W[2] can be shortened as compared with the method of the comparative example, and the necessary processing time can be shortened by the time ΔT within the control cycle Tc. Accordingly, it is also possible to shorten the control cycle Tc.

Second Embodiment (Application Example to Motor Control Device)

Figure 12:
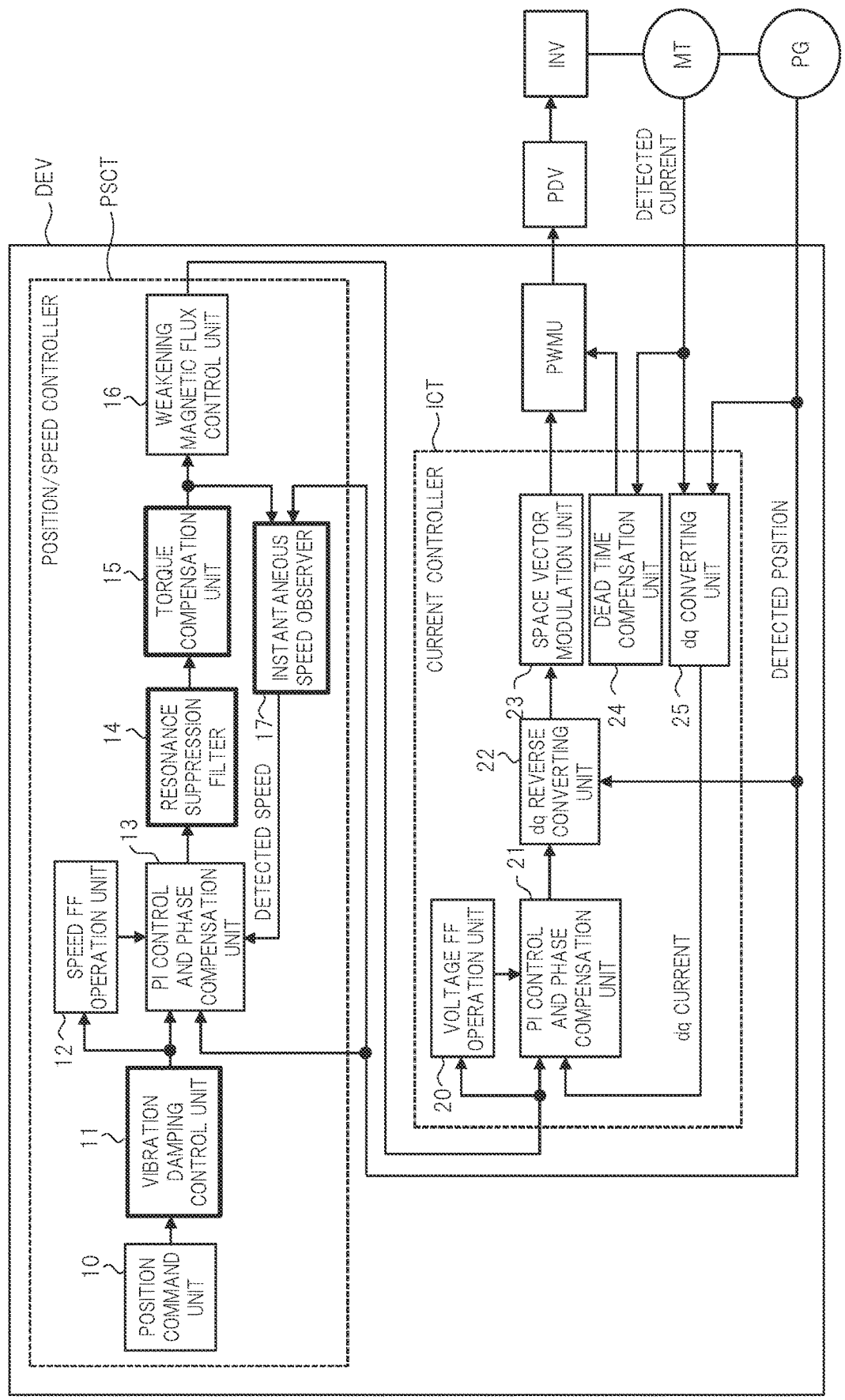
FIG. 12 is a schematic diagram showing a configuration example around a motor control device according to the second embodiment of the present invention.

FIG. 12 is a schematic diagram showing a configuration example around a motor control device according to the second embodiment of the present invention. FIG. 12 shows a motor control system including the semiconductor device DEV, a pre-driver PDV, an inverter INV, a motor MT, and a position sensor PG. Among these, for example, the semiconductor device DEV, the pre-driver PDV, and the inverter INV are mounted on a wiring board to form the motor control device. The motor MT is, for example, a three-phase (u-phase, v-phase, w-phase) brushless DC motor or the like, and controls the position of a controlled object. The position sensor PG is attached to the motor MT and detects a rotational position of the motor MT.

The inverter INV includes a three-phase high-side switching element connected between a high-potential-side power supply and three-phase input terminals of the motor MT and a three-phase low-side switching element connected between a low-potential-side power supply and three-phase input terminals of the motor MT. The inverter INV supplies electric power, specifically, three-phase AC power to the motor MT by switching each switching element. The pre-driver PDV receives a three-phase PWM signal from the semiconductor device DEV, and controls each switching element in the inverter INV based on the PWM signal.

As described in the first embodiment, the semiconductor device DEV is composed of, for example, a microcontroller or the like, and includes a position/speed controller PSCT, a current controller ICT, and a PWM unit PWMU. The position/speed controller PSCT and the current controller ICT are realized by, for example, program processing by the processor PRC in FIG. 1, and the PWM unit PWMU is realized by, for example, a hardware unit included in various peripheral circuits PERI in FIG. 1.

The semiconductor device DEV schematically controls the motor MT via the inverter INV based on a sensing result of the motor MT to be input at a predetermined control cycle. The sensing result of the motor MT includes a value of the detected position by the position sensor PG and a three-phase detected current value of the motor by a current sensor (not shown). When the sensing result is an analog value, the semiconductor device DEV converts it into a digital value by using an analog-to-digital converter included in the various peripheral circuits PERI, and then outputs the digital value to the position/speed controller PSCT and the current controller ICT.

The position/speed controller PSCT controls the position and speed of the motor MT based on the value of the detected position from the position sensor PG. In the position/speed controller PSCT, a position command unit 10 generates a position command value for determining the position of the controlled object based on, for example, a predetermined control sequence. A vibration damping control unit 11 corrects the position command value from the position command unit 10 and generates a corrected position command value in order to suppress the residual vibration of the controlled object that may occur during this position determination. A speed feedforward (abbreviated as FF) operation unit 12 calculates a speed FF compensation value based on the corrected position command value from the vibration damping control unit 11.

A PI (proportional/integral) control and phase compensation unit 13 calculates a manipulation value for making the error close to zero, that is, a speed command value based on the error between the corrected position command value from the vibration damping control unit 11 and the value of the detected position from the position sensor PG. At this time, the PI control and phase compensation unit 13 calculates the speed command value while reflecting the speed FF compensation value from the speed FF operation unit 12. Further, the PI control and phase compensation unit 13 calculates a manipulation value for making the error close to zero, that is, a torque command value based on the error between the speed command value and a detected speed value from an instantaneous speed observer 17.

A mechanical resonance suppression filter 14 is, for example, a notch filter for suppressing the resonance of the controlled object, and filters the manipulation value from the PI control and phase compensation unit 13. A torque compensation unit 15 compensates the filtered manipulation value from the mechanical resonance suppression filter 14, that is, the torque command value in accordance with, for example, the magnitude of the load of the motor MT.

A weakening magnetic flux control unit 16 generates a d-axis current command value and a q-axis current command value based on the torque command value from the torque compensation unit 15. The instantaneous speed observer 17 calculates the detected speed value based on the value of the detected position from the position sensor PG and the torque command value from the torque compensating unit 15. Specifically, the instantaneous speed observer 17 calculates the detected speed value based on, for example, the differential value of the value of the detected position and the integral value of the torque command value.

The current controller ICT controls the current of the motor MT and eventually the torque based on the value of the detected position from the position sensor PG, the d-axis current command value and the q-axis current command value from the position/speed controller PSCT, and the above-mentioned three-phase detected current value from the current sensor (not shown). In the current controller ICT, a dq converting unit 25 converts the three-phase detected current value from the current sensor (not shown) into a d-axis detected current value and a q-axis detected current based on the value of the detected position from the position sensor PG.

A dead time compensation unit 24 corrects the error between the voltage command and the actually output voltage caused by the dead time inserted by the PWM unit PWMU, and compensates the voltage command value based on the three-phase detected current value from the current sensor (not shown). The dead time is an interval that needs to be provided between the on/off time of the high-side switching element and the off/on time of the low-side switching element in each phase of the inverter INV.

A voltage FF operation unit 20 calculates a voltage FF compensation value based on the d-axis current command value and the q-axis current command value from the position/speed controller PSCT, specifically, the weakening magnetic flux control unit 16. The voltage FF compensation value compensates, for example, a voltage error due to a dead time. The PI control and phase compensation unit 21 calculates a manipulation value for making the error close to zero, that is, a d-axis voltage command value and a q-axis voltage command value based on the error between the d-axis current command value and the q-axis current command value from the position/speed controller PSCT and the d-axis current detected value and the q-axis current detected value from the dq converting unit 25. At this time, the PI control and phase compensation unit 21 calculates the d-axis voltage command value and the q-axis voltage command value while reflecting the voltage FF compensation value from the voltage FF operation unit 20.

A dq reverse converting unit 22 converts the d-axis voltage command value and the q-axis voltage command value from the PI control and phase compensation unit 21 into an a-axis voltage command value and a β-axis voltage command value by the reverse park conversion using the value of the detected position from the position sensor PG. A space vector modulation unit 23 modulates the a-axis voltage command value and the β-axis voltage command value from the dq reverse converting unit 22 into a three-phase voltage command value and eventually a three-phase PWM duty command value based on a specified modulation pattern.

The PWM unit PWMU generates a three-phase PWM signal reflecting the duty command value based on the three-phase PWM duty command value from the current controller ICT, specifically, the space vector modulation unit 23. At this time, the PWM unit PWMU inserts a dead time for preventing the short circuit due to the simultaneous turn-on of the high-side switching element and the low-side switching element. Then, the PWM unit PWMU controls each switching element in the inverter INV via the pre-driver PDV by using the three-phase PWM signal.

In the semiconductor device DEV described above, for example, the biquad IIR filter is mounted in the vibration dumping control unit 11, the mechanical resonance suppression filter 14, the torque compensation unit 15, and the instantaneous speed observer 17 in the position/speed controller PSCT. For example, six-stage IIR filters connected in cascade are mounted in the vibration damping control unit 11 and five-stage IIR filters connected in cascade are mounted in the mechanical resonance suppression filter 14. Further, five-stage IIR filters connected in cascade are mounted in the torque compensation unit 15 and two-stage IIR filters connected in cascade are mounted in the instantaneous speed observer 17.

In the semiconductor device DEV used in such a motor control device, it is necessary to complete a series of processing including the position/speed controller PSCT, the current controller ICT, and the PWM unit PWMU within the control cycle of the motor MT. On the other hand, particularly when it is required to control the motor MT at high speed and with high accuracy, many control blocks provided with IIR filters may be required as shown in FIG. 12. Therefore, there is a fear that the processing time of the semiconductor device DEV increases and exceeds the control cycle Tc as described in FIG. 11. The control cycle Tc of the motor MT is set to, for example, several tens of μs.

As a specific example, with reference to FIG. 11, the CPU in the semiconductor device DEV finishes the processing of the position command unit 10 within the CPU processing period CPU_P[1], and then causes the hardware accelerator HWA to perform the arithmetic operation of the IIR filter in the vibration damping control unit 11 within the waiting period IIR_W[1]. Subsequently, the CPU receives the output data Dout from the hardware accelerator HWA, and performs the processing of the speed FF operation unit 12 and the PI control and phase compensation unit 13 within the CPU processing period CPU_P[2]. Thereafter, the CPU causes the hardware accelerator HWA to perform the arithmetic operation of the IIR filter in the mechanical resonance suppression filter 14 within the waiting period IIR_W [2]. Then, the necessary processes are sequentially performed in the same manner.

Therefore, if the method of performing the output data operation in advance is used as described in the first embodiment, it is possible to shorten the processing time of the semiconductor device DEV as described in FIG. 11. As a result, it becomes possible to realize the high-speed and highly accurate motor control. Specifically, for example, the control cycle can be shortened, and more arithmetic processing of the IIR filter can be realized within the control cycle.

Figure 13A:
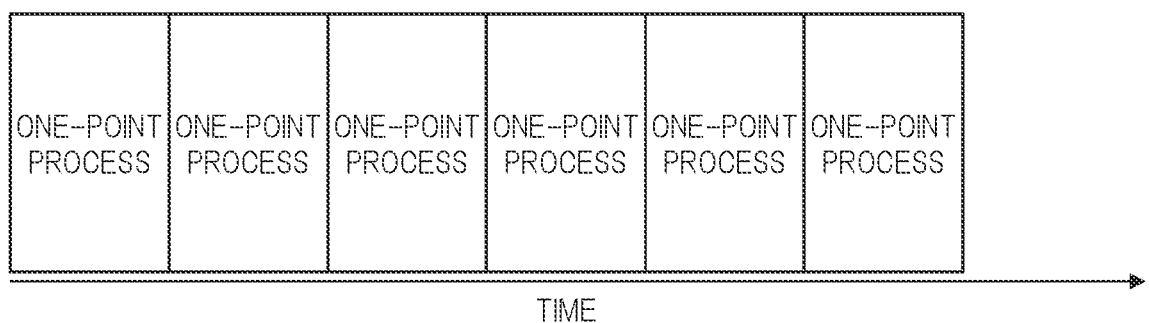
FIG. 13A is a conceptual diagram showing an example of an arithmetic operation method in various processing systems.
Figure 13B:
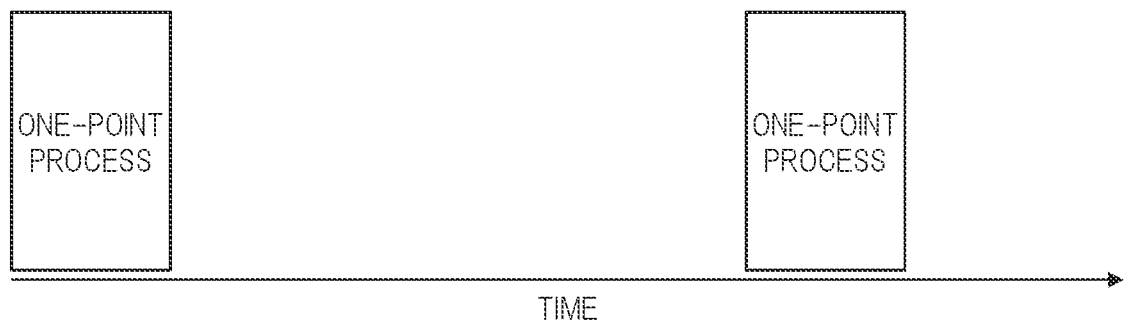
FIG. 13B is a conceptual diagram showing an example of an arithmetic operation method in various processing systems.

FIG. 13A and FIG. 13B are conceptual diagrams showing examples of an arithmetic operation method in various processing systems. FIG. 13A shows the process flow of the batch operation method. The batch operation method is, for example, a method used in non-real-time processing, in which the arithmetic processing is performed at once for input data Din collected to some extent and then the output data Dout is generated. For example, the case where a certain amount of input data Din is buffered and a plurality of input data Din is regularly processed at once as in audio processing can be presented.

FIG. 13B shows the process flow of the single operation method. The single operation method is, for example, a method used in real-time processing, in which it is only necessary to complete the arithmetic processing for the first input data Din before the second input data is input. In the case of the method of FIG. 13A, it is necessary to perform the arithmetic processing for the second input data Din after completing both the output data operation and the delay data operation for the first input data Din. Therefore, it is difficult to obtain the effect of performing the output data operation in advance, and for example, the effect is only such that the output data associated with the final arithmetic processing can be obtained earlier.

On the other hand, in motor control, the single operation method shown in FIG. 13B is used. In the case of the method of FIG. 13B, as described above, a large effect can be obtained by performing the output data operation in advance. The method of the embodiment can obtain the beneficial effect particularly when applying it to a processing system and a control system using the single operation method in addition to the motor control described above.

Main Effect of Second Embodiment

As described above, by using the method of the second embodiment, the same effects as the various effects described in the first embodiment can be obtained. In addition to this, it becomes possible to realize high-speed and highly accurate motor control.

In the foregoing, the invention made by the inventors has been specifically described based on the embodiments, but the present invention is not limited to the embodiments described above and can be variously modified within the range not departing from the gist thereof. For example, the embodiments above have been described in detail in order to make the present invention easily understood, and the present invention is not necessarily limited to the embodiments having all of the described configurations. Also, part of the configuration of one embodiment may be replaced with the configuration of another embodiment, and the configuration of one embodiment may be added to the configuration of another embodiment. Furthermore, another configuration may be added to part of the configuration of each embodiment, and part of the configuration of each embodiment may be eliminated or replaced with another configuration.

What is claimed is:

1. A semiconductor device comprising:
an arithmetic unit including a multiplier and an adder;
a memory configured to hold calculated data; and
a control circuit configured to control the arithmetic unit and the memory,
wherein the control circuit receives a command from outside and causes the arithmetic unit to perform arithmetic operation M times (M is an integer of 2 or more) by using input data from outside and the calculated data held in the memory, thereby making the arithmetic unit and the memory function as an IIR (Infinite Impulse Response) filter including a multiplication block, an addition block, and a delay block,
wherein the IIR filter is a filter capable of determining output data by arithmetic operation of K times out of the M times (K<M),
wherein the control circuit receives the command from outside and then causes the arithmetic unit to perform the arithmetic operation K times in advance, thereby determining the output data and outputting the output data to the outside at the time of the determination,
wherein the arithmetic operation performed M times in the IIR filter is divided into output data operation required for determining the output data and delay data operation required for determining the calculated data held in the memory serving as the delay block,
wherein the control circuit causes the arithmetic unit to perform the output data operation in advance and then perform the delay data operation, and
wherein the control circuit causes the arithmetic unit and the memory to function as the IIR filters at multiple stages connected in cascade, causes the arithmetic unit to sequentially perform the output data operations in the IIR filters at multiple stages from first stage to final stage after receiving the command from outside and then sequentially perform the delay data operations in the IIR filters at the multiple stages from first stage to final stage, and causes the arithmetic unit to output the output data of the IIR filter at the final stage to outside at the time when the output data operation in the IIR filter at the final stage is finished.

2. The semiconductor device according to claim 1, wherein the control circuit causes the memory to hold the calculated data obtained by the output data operations from first stage to final stage and causes the arithmetic unit t to perform the delay data operations from first stage to final stage by using the held calculated data.

3. The semiconductor device according to claim 1, wherein the control circuit causes the memory to hold the input data from outside and causes the arithmetic unit to sequentially perform the delay data operations from first stage to final stage by using the held input data.

4. The semiconductor device according to claim 1, wherein the IIR filter has a flipped configuration.

5. The semiconductor device according to claim 1, further comprising:
a CPU (Central Processing Unit) configured to output the command from outside and the input data from outside.

6. A motor control device comprising:
an inverter configured to supply electric power to a motor; and
a semiconductor device which includes a CPU (Central Processing Unit) and a hardware accelerator configured to support processing of the CPU and controls the motor via the inverter based on a sensing result of the motor input at a predetermined control cycle,
wherein the hardware accelerator includes:
an arithmetic unit including a multiplier and an adder;
a memory configured to hold calculated data; and
a control circuit configured to control the arithmetic unit and the memory,
wherein the control circuit receives a command from the CPU and causes the arithmetic unit to perform arithmetic operation M times (M is an integer of 2 or more) by using input data from the CPU and the calculated data held in the memory, thereby making the arithmetic unit and the memory function as an IIR (Infinite Impulse Response) filter including a multiplication block, an addition block, and a delay block,
wherein the IIR filter is a filter capable of determining output data by arithmetic operation of K times out of the M times (K<M),
wherein the control circuit receives the command from the CPU and then causes the arithmetic unit to perform the arithmetic operation K times in advance, thereby determining the output data and outputting the output data to the CPU at the time of the determination,
wherein the arithmetic operation performed M times in the IIR filter is divided into output data operation required for determining the output data and delay data operation required for determining the calculated data held in the memory serving as the delay block,
wherein the control circuit causes the arithmetic unit to perform the output data operation in advance and then perform the delay data operation, and
wherein the control circuit causes the arithmetic unit and the memory to function as the IIR filters at multiple stages connected in cascade, causes the arithmetic unit to sequentially perform the output data operations in the IIR filters at multiple stages from first stage to final stage after receiving the command from the CPU and then sequentially perform the delay data operations in the IIR filters at the multiple stages from first stage to final stage, and causes the arithmetic unit to output the output data of the IIR filter at the final stage to the CPU at the time when the output data operation in the IIR filter at the final stage is finished.

7. The motor control device according to claim 6, wherein the control circuit causes the memory to hold the calculated data obtained by the output data operations from first stage to final stage and causes the arithmetic unit to perform the delay data operations from first stage to final stage by using the held calculated data.

8. The motor control, device according to claim 6, wherein the control circuit causes the memory to hold the input data from outside and causes the arithmetic unit to sequentially perform the delay data operations from first stage to final stage by using the held input data.

9. The motor control device according to claim 6, wherein the IIR filter has a flipped configuration.

* * * * *